L. JOHNS.
CHILD'S CONVERTIBLE VEHICLE.
APPLICATION FILED MAR. 19, 1920.
1,379,305.
Patented May 24, 1921.
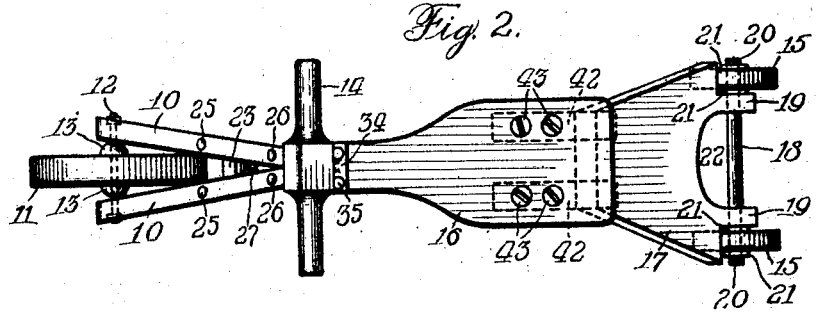
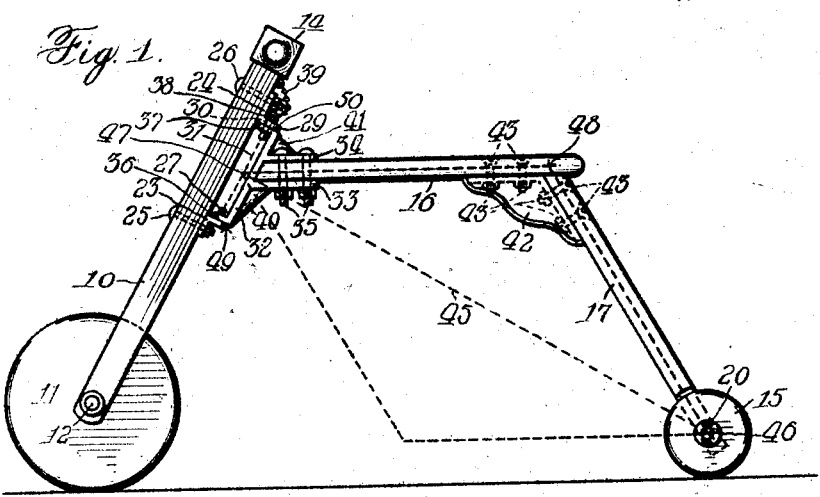
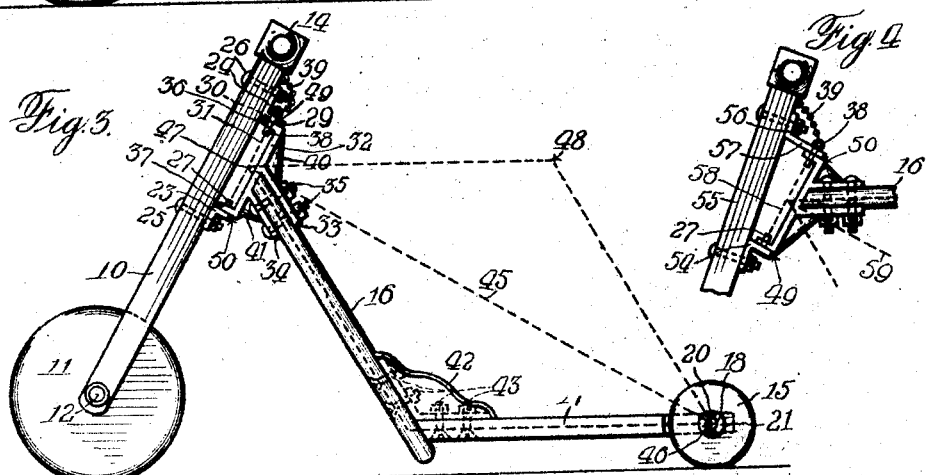
Witness:
C. H. Wood.
Inventor:
Luther Johns

UNITED STATES PATENT OFFICE.

LUTHER JOHNS, OF OAK PARK, ILLINOIS.

CHILD'S CONVERTIBLE VEHICLE.

1,379,305.

Specification of Letters Patent.

Patented May 24, 1921.

Application filed March 19, 1920. Serial No. 367,103.

*To all whom it may concern:*

Be it known that I, LUTHER JOHNS, a citizen of the United States, and a resident of the village of Oak Park, in the county of Cook and State of Illinois, have invented certain new and useful Improvements in Children's Convertible Vehicles, of which the following is a specification.

My invention relates to vehicles for use by children. A prime object is to provide a simple form of device which is readily changeable from one type, character or class into another whereby a material expense is saved to the purchaser who desires a vehicle of each type and whereby the purchaser who would ordinarily feel able to buy but one is provided at the same time with a vehicle of each type. An advantage resides also in the saving of space in the home and in the reduction of plaything units without loss of advantage. An important object is to provide a form of vehicle which the child himself may readily convert from one type into the other, thus affording him a peculiar kind of interest and entertainment, as well as mechanical exercise and training. A specific object is to provide a convertible vehicle of the character herein described which is of simple and few parts, and which is strong and durable. Other objects and advantages will appear hereinafter.

In devices of the present general class there are two principal types. One of these is exemplified in a vehicle in which the child places one foot upon a low, substantially horizontal foot-support and, while holding the handle bar, pushes with his other foot upon the ground. The other type includes a seat upon which the child rests his body, steering being done by the hands as in the other type of device, movement being accomplished by pushing with both feet upon the ground or other traction surface. These devices may be called foot vehicles and seat vehicles respectively.

In the accompanying drawings, which form a part of this specification Figure 1 is a side elevation of my novel device arranged for use as a seat vehicle; Fig. 2 is a top plan thereof; Fig. 3 is a side view of the same device arranged for use as a foot vehicle; and Fig. 4 is a fragment showing a modification of the pivotal connection.

The illustrated device includes a steering post 10 which is shown as comprising a pair of wooden bars diverging downwardly and having the wheel 11 mounted in the fork thus produced, as upon the bolt 12, a pair of spacers 13 maintaining the wheel medially between the bars. At the top of these steering post bars the handle bar 14 is secured, as by mortising the handle bar to receive the ends of the steering post bars and driving nails through these upright and transverse members. The steering post may be of any approved construction within the scope of the improvements herein set forth.

The present device will ordinarily be provided with a pair of rear wheels 15, although it is feasible to use but a single rear wheel. Other forms of traveling members may be employed.

Carried by the front and rear wheels is a unitary intermediate member comprising two principal parts 16 and 17 which are shown as being formed of wooden board material and rigidly connected in fixed angular relation to each other. The part 16 constitutes a seat in one of the operative positions of the intermediate structure, as in Fig. 1, and is suitably narrowed at its forward portion whereby it may be conveniently straddled by the child. In this "seat vehicle" position it is substantially horizontal with the ground or other traction surface on which the vehicle is propelled, and in this position it is supported by the part 17.

The part 17 constitutes a foot rest when the intermediate member is in the position shown by Fig. 3, in which position the seat part 16 is in an out-of-the-way position and constitutes a support for the foot rest part, the device thus being of the "foot vehicle" type.

To change the device from a vehicle of one class into the other the intermediate member is inverted or turned upside-down from the relative position thereof shown in Fig. 1 to the relative position thereof shown in Fig. 3, and vice versa.

In the device illustrated when the intermediate structure is inverted or turned upside-down the wheels 15 are carried with it, these rear wheels being mounted upon the rod 18 which passes through the rear extensions 19 of the seat part 17, cotter pins 20 holding the wheels in place, washers 21 being placed at the sides of the wheels respectively. The part 17 is preferably cut away at 22 to provide room for the foot or feet of the child upon the shaft 18 in some uses of the device.

The seat part 16 is connected to the steering post 10 by a pivotal connection which comprises a lower bracket 23 and an upper bracket 24 secured rigidly to the steering post, as by bolts 25 and 26 respectively. The lower bracket 23 has rigidly secured to it an upstanding pintle 27, the axis of which is parallel to the line of inclination of the steering post and at right angles to the diagonal 45 in the device illustrated in Figs. 1, 2 and 3. The upper bracket 24 has an ear 29 extending rearwardly substantially at right angles to the line of inclination of the steering post, and is provided with a pivot hole at 30 which is in alinement with the pintle 27, as indicated by the dotted line 31.

These brackets 23 and 24 are spaced apart in up-and-down directions such a considerable distance as will provide strong holding properties through the leverage action which increases with the increase of the distance between them. In practice if they be spaced apart say four or five inches it will be found ample, although it is a peculiar property of the construction shown that the distance may be increased to the limits provided by the steering post, a corresponding increase being made in the coöperative pivotal connection member 32 secured upon the seat part 16.

This coöperative connection member 32 is shown as a casting. It includes a pair of oppositely disposed plate-like elements 33 and 34 lying upon the front end portion of the seat part 16 and securely held there by bolts 35. It also includes forwardly extending ears 36 and 37 which, in the construction shown in Figs. 1, 2 and 3, are at right angles with the line of inclination of the steering post, and each of these extensions 36 and 37 is bored in alinement so that one of these extensions 36 or 37 may be held pivotally upon the pintle 27 while the other thereof may be held by the pivot pin 38 passing through the hole in the upper bracket 24 as shown in the drawings. This pin 38 is preferably secured to the steering post by a chain or cord 39 so that it will always be available for use. The forward extensions 36 and 37 are connected to the parts 33 and 34 by integral parts including the strengthening webs 40 and 41.

The pivotal connection device shown comprises substantially a pair of rearwardly extending jaws rigidly held by the steering post and a pair of forwardly extending jaws rigidly held at the front end of the intermediate structure, the opposed jaw members coöperatively interfitting with each other, with means including a movable pivot for holding the connection devices operatively together.

The intermediate structure parts 16 and 17 are rigidly connected together as a unitary member in the form of device shown. For this purpose I provide a pair of oppositely disposed holding and reinforcing brackets 42 held in place strongly upon the main parts 16 and 17 by the bolts 43.

The parts 16 and 17 as illustrated constitute two sides of a parallelogram, the other two sides being shown by dotted lines in Figs. 1 and 3. The relatively long upwardly-and-forwardly-extending diagonal 45 of this parallelogram has its one end at 46, namely the center of the shaft 18, and its other end at 47, which is in the dotted line 31. In other words, the point 47 is in the axis of the pivots 27 and 38. If now the distance from the point 47 to the point 48 be the same as the distance from 48 to 46 (as shown), we have in the effective length of the two parts 16 and 17 two sides of an equilateral parallelogram, and in such case the point 47 will be midway between the surfaces 49 and 50 of the connection 32 where they engage respectively the bearing surfaces of the brackets 23 and 24. The angle of the plates 33 and 34 lying upon the seat member 16 is naturally determined by the lines of the parallelogram passing between them. A peculiar feature of the construction is that when the holding pin 38 is removed and the intermediate structure is turned upside-down the connection member 32 will again interfit with the brackets 23 and 24 and may again be operatively held there by the pin 38 and maintain the parts 16 and 17 in the lines of the other two sides of the parallelogram as shown.

According to this construction the change from the device of one type to that of the other is accomplished without any adjustment or modification of structural parts, and, through the provision of the fixed pivot pintle 27 it is only necessary to slip one of the extensions 36 or 37 upon it and swing the pin hole at the top of the connection element 32 into alinement with the hole in the extension 29 and slip the pin 38 through these holes to connect the steering post and the rest of the structure operatively together.

Another law of the construction illustrated in Figs. 1, 2 and 3 is that the steering post 10 is at right angles to the diagonal 45, where the dotted line 31 between the pivots is parallel to the line of inclination of the steering post as shown.

In this connection it is pointed out that the angle at 48 may be varied in both directions from that shown in Figs. 1 and 2. If this angle at 48 be increased, the inclination of the steering post will be less, by which I mean it will more nearly approach the vertical. On the other hand, if this angle at 48 be reduced, the steering post will incline more from bottom to top rearwardly. When the angle at 48 is approximately that shown in the drawings, (a reasonable departure in either direction being permissible) the angle of inclination of the steering post will be suitable for practical purposes.

It is pointed out also that the seat part 16 and the foot-rest part 17 do not need to be essentially and effectively parts of an equilateral parallelogram as illustrated and described hereinabove. One may be longer than the other and yet without requiring a different form of connection between the steering post and the intermediate structure. In such case, however the point 47 will not be in its midway position between the surfaces 49 and 50 as illustrated. Thus it will be clear from Fig. 1 that if the foot-rest part 17 were lengthened the seat part 16 and the point 47 would be carried upward, and that on reversing the intermediate structure the point 47 would be lower than the middle between the surfaces 49 and 50. In practice, however, consideration must be had of the desirable length of the foot part 17 as well as of the seat part 16, and, according to my present understanding, most satisfactory results will be had with the construction on the lines of substantially an equilateral parallelogram.

It is also pointed out that the inclination of the steering post may be modified otherwise than by changing the angles of the parallelogram, and with only slight departure from the construction described. In Fig. 4 the steering post 55 and all of the various other details are to be considered as in accordance with Figs. 1, 2 and 3 except as to the brackets 54 and 56, which are in all general respects like the brackets 23 and 24 respectively. The bracket 56 has its pivot extension 57 lengthened, the pin 38 being farther away from the rear surface of the steering post than in the case of the other figures, and the angle of both brackets 54 and 56 is suitably changed to conform to the angle of inclination of the steering post. The dotted line 58 showing the axis of the pivotal connection is at right angles to the diagonal 59, but, owing to the length of the extension 57, the steering post is now more nearly vertical. This feature provides for more compactness of the device, and it carries the handle bars more forward, giving greater reach for the arms if desired.

Referring to Fig. 2 it will be noted that I have carried the sides of the foot-rest part 17 outwardly, with the rear wheels positioned in a sort of recess or pocket within the outer limits of the sides. This feature provides that when the device is used as a foot vehicle the rearwardly extending foot of the child will not be run into by one of the wheels, and it also provides means for easing the device around articles of furniture without objectionable impact upon them when used in the house.

Different sizes of the device illustrated may be formed by making the effective length of the parts 16 and 17 greater or less, preferably preserving them of approximately equal length. Thus, in practice, if an effective length of twelve inches be adopted for each of the parts 16 and 17 a smaller vehicle having a lower seat will result from making each of the parts 16 and 17 say ten inches in length.

Other forms of connection devices between the steering post and the intermediate structure may be employed and other changes in details of construction and arrangement may be made without departing from the spirit of the invention herein set forth, and I contemplate all changes, modifications and departures from what is specifically shown and described as are included within the scope of the appended claims.

I claim:

1. A convertible vehicle including a steering post, a front wheel mounted therein, rear wheels, an intermediate structure having two main parts in rigid and fixed angular relation to each other, one of said parts comprising a foot rest in one operative position of the structure and the other part comprising a seat in an operative position of the structure which is upside-down with respect to the firstly-mentioned operative position, and means for holding the intermediate structure in each of said operative positions, said means including pivoting elements permanently held on the steering post, pivoting elements permanently held on the front end of the seat part and which coöperatively interfit with the firstly-mentioned pivoting elements when the intermediate structure is in each of said operative positions, means for holding the interfitting pivoting elements coöperatively together when the intermediate structure is in each of said positions, and means for holding the rear wheels at the rear end of the intermediate structure.

2. A convertible vehicle of the character described including a steering post and a front wheel operatively mounted therein, rear wheels, a rigid intermediate member having two operative positions relative to the front and rear wheels, the rear wheels being operatively carried at the rear end portion of said intermediate member, said intermediate member having a part substantially horizontally disposed and constituting a foot-rest in one of said operative positions and having a forward part rigidly connected to said other part in fixed angular relation and being substantially horizontally disposed and constituting a seat in the other of said operative positions, and pivot means operating on an up-and-down axis for holding said intermediate member in each of said operative positions, said pivot means including pivot-holding elements spaced apart in the up-and-down directions and held permanently on the steering post and coöperating pivot-holding elements spaced apart in the up-and-down directions permanently carried by the front end of the intermediate member.

3. A convertible vehicle comprising a steering post, a front wheel therein, rear wheels, a rigid unitary intermediate member comprising a foot-rest part and a seat part and having two operative positions one of which is upside-down with respect to the other thereof, means for holding the rear wheels upon the rear end portion of said intermediate member, and means for holding the front end of the intermediate member in operative connection with the steering post in each of its said operative positions, said last-mentioned means including two pairs of interengaging jaws, the jaws of each pair being spaced apart in up-and-down directions, one pair of said jaws being carried permanently by the intermediate member and extending forwardly, the other pair being carried permanently by the steering post and extending rearwardly, and pivot means including a readily releasable pivot operating on an up-and-down axis for holding said interfitting jaws operatively together.

4. In a convertible vehicle of the character described having a steering post with a front wheel therein, rear wheels, and a rigid intermediate member adapted to be turned upside-down from one operative position into another to provide vehicles of different types, the combination therewith of means for holding the front end of the intermediate member in operative association with the steering post in each of said operative positions, said means comprising an upper and a lower forwardly projecting pivot support carried rigidly by the front end of the intermediate member, an upper and a lower rearwardly projecting pivot support carried rigidly by the steering post, the two upper pivot supports interengaging with each other and the two lower pivot supports interengaging with each other, one of the four pivot supports having a fixed pintle on an up-and-down axis and the pivot support with which it interengages having a hole on an up-and-down axis adapted to receive the pintle, the other two of said four pivot supports having holes in alinement with each other and in alinement with said pintle when the parts are in operative position, and a readily retractable pivot for said two alining holes.

5. A convertible vehicle of the character described including a steering post and a front wheel operatively mounted therein, rear wheels, a rigid intermediate member having two operative positions relative to the front and rear wheels, the rear wheels being operatively carried at the rear end portion of said intermediate member, said intermediate member having a part substantially horizontally disposed and constituting a foot-rest in one of said operative positions and having a forward part rigidly connected to said other part in fixed angular relation and being substantially horizontally disposed and constituting a seat in the other of said operative positions, said foot-rest part and said seat part being of approximately the same length, and pivot means operating on an up-and-down axis for holding said intermediate member in each of said operative positions, said pivot means including pivot-holding elements spaced apart in the up-and-down directions and held permanently on the steering post and coöperating pivot-holding elements spaced apart in the up-and-down directions permanently carried by the front end of the intermediate member.

LUTHER JOHNS.